United States Patent [19]

Bridges

[11] Patent Number: 5,086,809
[45] Date of Patent: Feb. 11, 1992

[54] PIPE COUPLING AND SEALING DEVICE

[76] Inventor: Donald Y. Bridges, 3014 Creek Ct., Roswell, Ga. 30075

[21] Appl. No.: 536,695

[22] Filed: Jun. 12, 1990

[51] Int. Cl.⁵ .............................................. F16L 19/12
[52] U.S. Cl. ......................................... 138/99; 138/97; 138/98
[58] Field of Search .................... 138/99, 97; 285/373; 277/101; 24/274 R

[56] References Cited

U.S. PATENT DOCUMENTS

| | | | |
|---|---|---|---|
| 863,887 | 8/1907 | Stuttle | 285/373 |
| 1,607,943 | 11/1926 | Carson et al. | |
| 2,913,262 | 11/1959 | De Cenzo et al. | |
| 3,153,550 | 10/1964 | Hollett | |
| 4,360,227 | 11/1982 | Bridges | |
| 4,391,458 | 7/1983 | Blakeley | 285/373 |
| 4,583,770 | 4/1986 | Kreku | 285/373 |
| 4,653,782 | 3/1987 | Munday | 285/15 |
| 4,664,428 | 5/1987 | Bridges | 285/373 |

OTHER PUBLICATIONS

Depend-O-Lok Mechanical Coupling Systems, Catalog 202 Brico Industries, Inc., P.O. Box 80793, Atlanta, Ga. 30366.

Primary Examiner—Philip R. Coe
Assistant Examiner—Terrence R. Till
Attorney, Agent, or Firm—Jones, Askew & Lunsford

[57] ABSTRACT

A pipe coupling includes a cylinder with an axial joint and a sealing device for sealing the fluid pathways between a leak location and the outer surface of the coupling. The sealing device includes arcuate gaskets extending along the inner surface of the cylinder and between axial gaskets which may be adhered to either side of the cylinder's axial joint. A clamping assembly closes the coupling so that an area of overlap is formed between the axial gaskets, thereby sealing the axial joint. The area of overlap is approximately equal to the thickness of the arcuate gaskets so that the sealing device exerts a uniform circumferential pressure upon the pipe without buckling or deforming the seal. The sealing gasket having arcuate gaskets extending between the axial gaskets may be provided separately. The first axial gasket may then be positoned so as to overlap the outer surface of the other axial gasket, and a coupling may be fitted over the gasket apparatus without deforming the seal provided thereby.

39 Claims, 3 Drawing Sheets

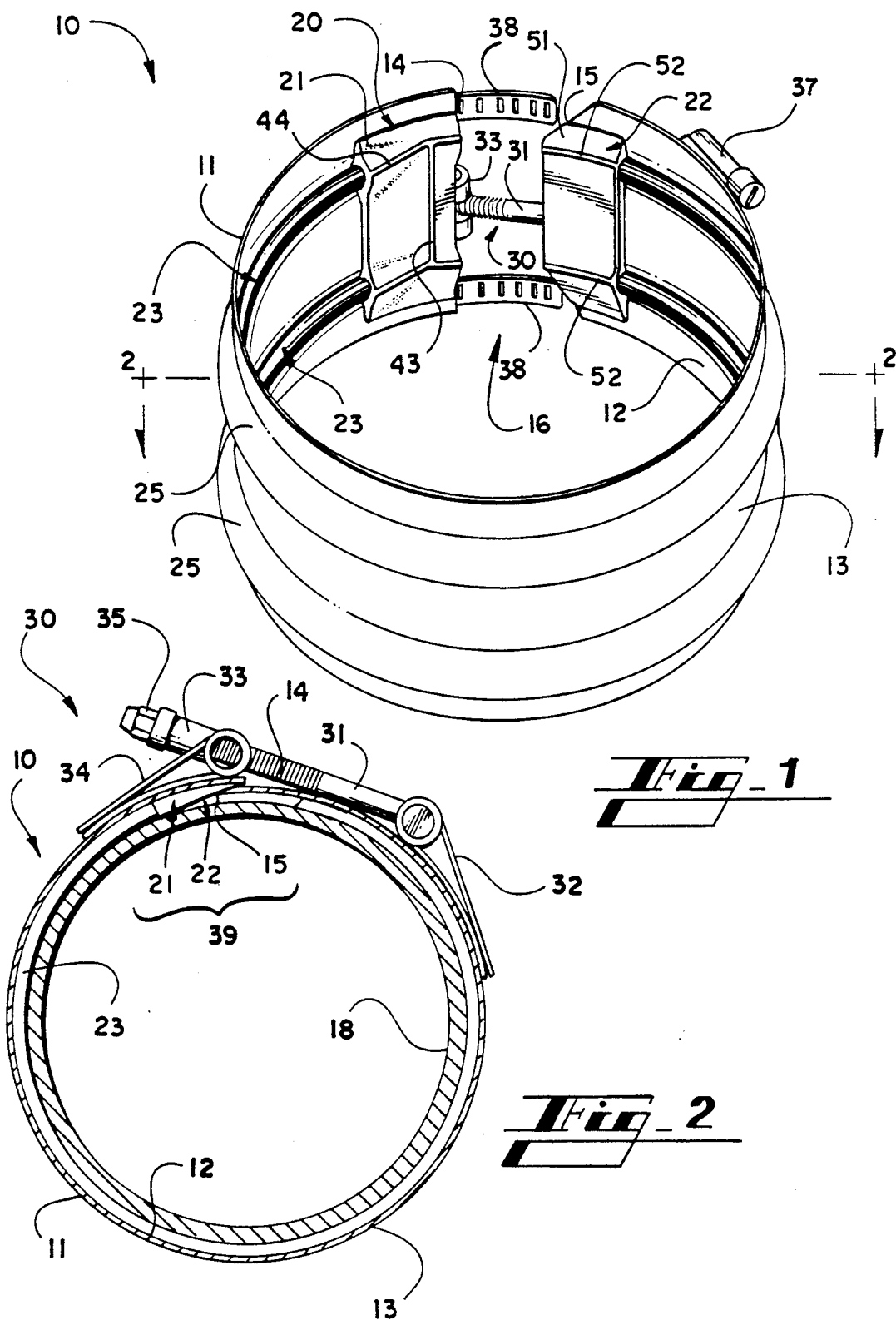

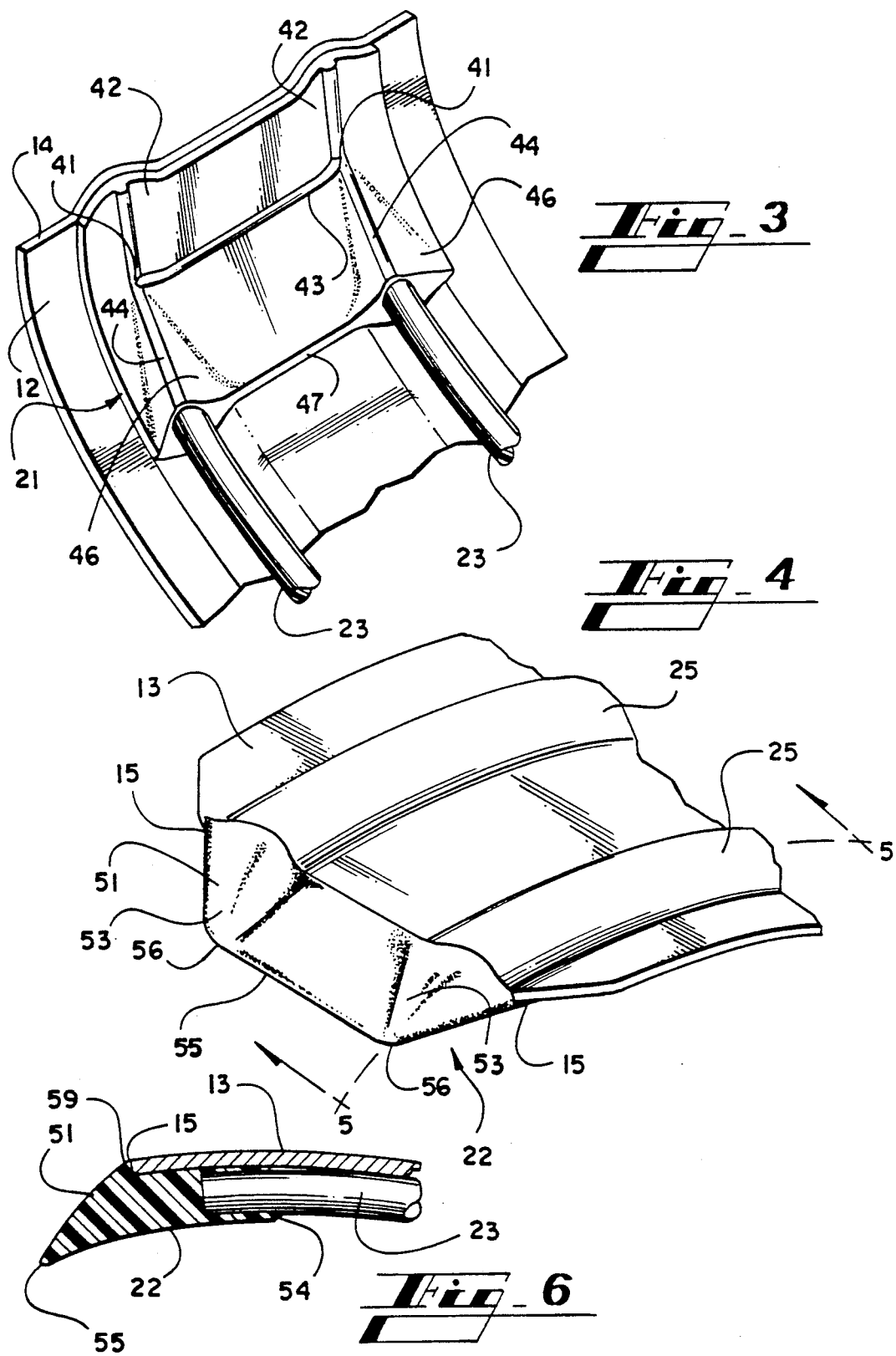

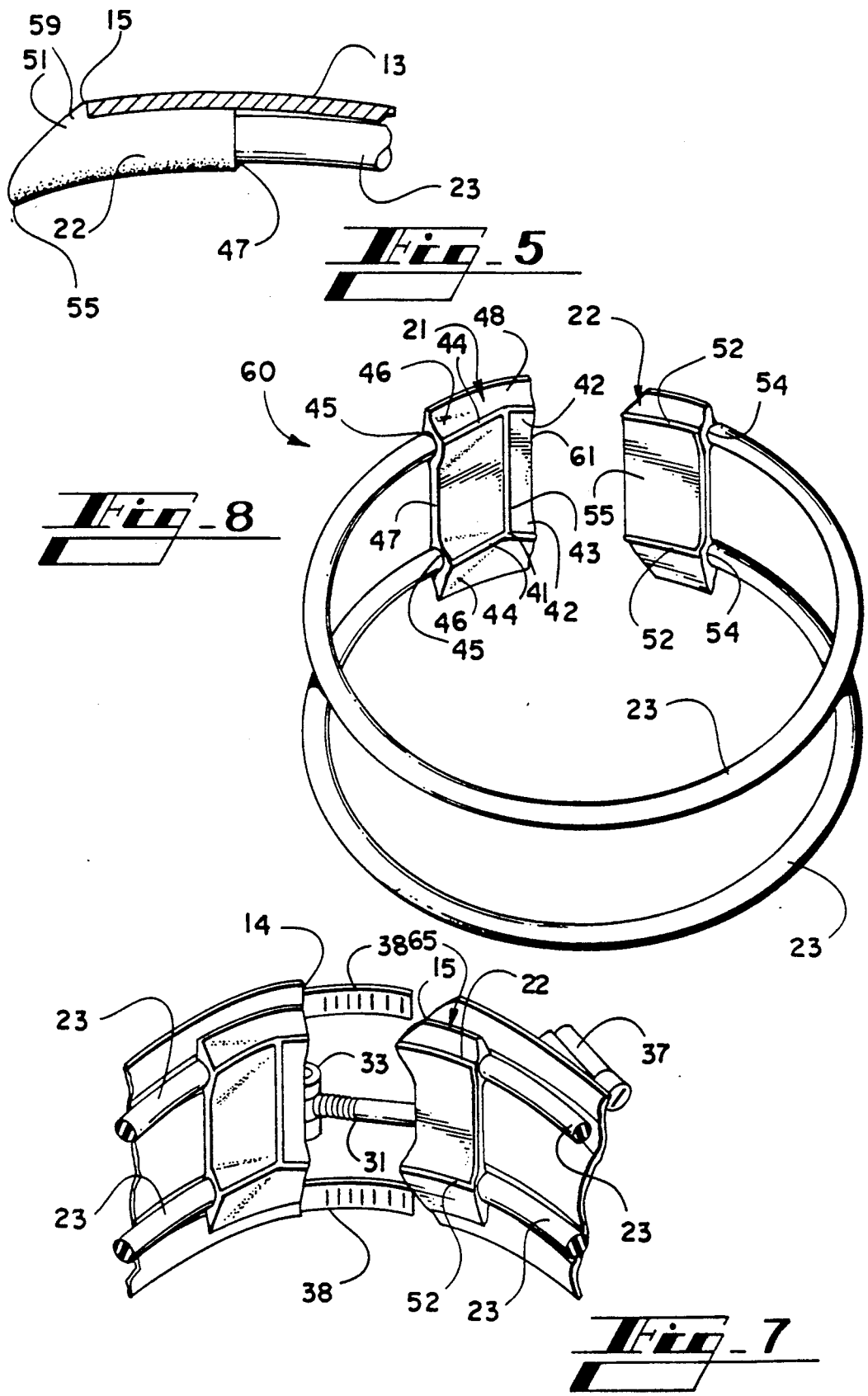

PIPE COUPLING AND SEALING DEVICE

TECHNICAL FIELD

The present invention relates to couplings for sealing leak locations in pipes, and particularly relates to pipe couplings for sealing against leakage of fluid materials from pipe joints or damaged areas between joints.

BACKGROUND OF THE INVENTION

Most pipelines must be assembled from a series of pipe sections abutted end-to-end, and many require that fluid materials, such as liquid chemicals, or fluid-like material, such as fine particulate dust or gases, be conveyed without leakage. Some such fluid materials are conveyed under pressure. In order to avoid leakage, the pipe sections must be coupled in a manner which seals the joint. A coupling for joining two abutting pipe ends may typically include either two semi-cylindrical pieces fastened together to clamp the pipe ends, or a single cylindrical piece having an axial slit which allows the coupling to be opened by an amount sufficient to fit over the pipe ends. A coupling may also be used where a pipe has developed a leak remote from the pipe ends and must be repaired.

Whether the task involves joining pipe sections or repairing pipes, gaskets are used often to seal all possible pathways through which fluid materials might escape from the interior of the pipe sections to the exterior of the pipe coupling. A major portion of the sealing function can be accomplished by placing annular gaskets, such as O-rings, around the respective ends of pipe sections. The O-rings are positioned between the coupling and the outer surfaces of the pipe ends. The pressure of the fit causes the O-rings to change shape, filling the space between the coupling and the outer surfaces of the pipe. In this way, fluid materials are blocked from leaking past the O-rings along the surfaces of the pipe. However, the use of O-rings to minimize leakage presents several problems when pipelines are being repaired. First, placing O-rings around pipe ends may be difficult if there is insufficient room to maneuver the O-rings onto the pipe ends. It is standard practice with O-rings to size them so that their inner diameter is smaller than the outer diameter of the pipe upon which they are to be installed. "Stretching" the O-rings onto the pipe tends to keep the O-rings in place and reduces their tendency to bunch up or to buckle. However, stretching O-rings onto a pipe can be difficult in some situations. In fact, it may be impossible to slide O-rings onto a section of pipe to be repaired without cutting the pipe, removing an entire section of pipe, or otherwise complicating the repair project. If the repair is a leak located between pipe ends, installation of O-rings may be impossible.

Further, positioning O-rings between the coupling and the outer surfaces of the pipe may strain the axial joints of the coupling and allow for leakage through the axial joints. The pressure exerted on the O-rings from their placement between the coupling and the pipe may not be uniform causing the O-rings to buckle and lose their seal. Or, the pressure exerted by the coupling may be transmitted through the O-rings to the pipe, causing cracks.

While O-rings may accomplish a large part of the sealing function, the fluid pathway through the axial joints in the coupling must also be sealed. Generally, axial gaskets have been used to provide a seal along the axial joints. One approach, as shown in U.S. Pat. No. 2,913,262 and U.S. Pat. No. 3,153,550, has been to provide an axial gasket extending between the O-rings within the axial joints of the coupling. A problem with this approach is that the coupling must be precisely closed to effect a reliable seal. An overly tight coupling may deform the seal provided by the gasket assembly and allow for leakage.

Another approach, as shown in U.S. Pat. No. 1,607,943, has been to provide an annular central web connecting the O-rings, completely surrounding the pipe ends and spanning the gap between the pipe ends. This solution has the disadvantage that if the web is physically pressed by the coupling against the pipe ends, sharp or ragged pipe ends may cause damage to the gasket or otherwise cause wear which may lead to early deterioration of the gasket. If the web is not pressed against the pipe ends by the coupling, then the pressure of fluid within the pipes must be relied upon to maintain the seal of the joint. If the diameter of the web does not accurately match that of the pipe, the web may buckle or otherwise deform, thereby defeating its sealing function. This may happen even with known web-type gaskets which include a slanted axial joint. Excess force on the coupling may then be required to close up gaps and form a seal.

Other types of gasket devices used to seal leak locations include repair sleeves and wraparound gaskets. These devices generally include a flat piece of rubber with a waffle pattern that contacts the pipe. A problem with this type of sealing device is that it does not allow for movement or deflection of the pipe ends at the joint or the pipe at a leak location. Deflection of the pipe may break the seal between the waffle material and the pipe.

U.S. Pat. No. 4,360,227 discloses a successful pipe coupling and gasket for solving some of the problems in the art. The gasket includes O-rings joined by a web only in the area of the axial slit of the coupling. Assembly of the preferred embodiment requires molding of the shaped web and vulcanizing or otherwise bonding the web to the O-rings, plus the further attachment of a shield under the web, if desired. Installation on pipe ends requires that the pipe ends be held together while stretching both O-rings over the adjacent pipe ends, and while the coupling is fitted over the gasket and pipe ends. A disadvantage of this approach is that in some installations it is difficult to get the web and O-ring assembly to stay in place on the pipe ends during installation of the coupling. In addition, positioning the web against the O-rings and fitting the coupling over both may deform or buckle the O-rings and affect the seal that they provide, thereby permitting leakage.

Another approach for sealing the axial joint of a coupling is described in U.S. Pat. No. 4,664,428, which describes a sealing plate spanning the axial slit of the coupling member. The sealing plate carries on its upper surface a pair of axial gaskets which seal against the coupling above the sealing plate and against O-rings on the pipe sections below the sealing plate. U.S. Pat. No. 4,664,428 also describes a sealing gasket extending along an axial edge of the coupling so that the gasket is positioned between the axial edge and the inner surface of the coupling when the coupling is fixed around the pipe. Both approaches described in U.S. Pat. No. 4,664,428 have the common disadvantage shared by the previously described prior art, that is, that in fitting the pipe coupling over the O-rings and other gaskets, the O-rings may buckle, deform, or be displaced, thereby allowing leakage.

Thus, there is a need in the art for a means to seal a leak location in a pipe quickly and easily without expensive equipment or a high degree of skill for installation. Further, there is a need in the art for a pipe coupling that reliably seals all fluid paths from the interior of the pipe sections to the exterior of the pipe coupling. In particular, there is a need in the art for a means to seal the axial joint of a pipe coupling without deforming the seal provided by O-rings and axially extending gasket material positioned between the pipe coupling and the outer surfaces of a pipe. There is also a need for such a pipe coupling made of stainless steel, but which is lightweight and for use in connection with low to moderate pressure pipes.

SUMMARY OF THE INVENTION

The present invention solves the problems experienced in the prior art by providing a pipe coupling with a sealing device having arcuate gasket segments and axial gaskets. The axial gaskets seal the axial joint of the coupling without deforming the seal around the pipe provided by the arcuate gasket segments.

Generally described, the present invention provides an apparatus for sealing a leak location in a pipe, comprising a cylinder with an inner surface and an outer surface and with an axial joint defined by a first axial edge and a second axial edge. The apparatus further comprises a sealing device for preventing passage of fluid to the outer surface of the cylinder. In particular, the sealing device includes a first axial gasket which is adhered to the inner surface of the cylinder adjacent to the first axial edge, and a second axial gasket which is also adhered to the inner surface of the cylinder, but adjacent to the second axial edge. In the preferred embodiment, a portion of the second axial gasket extends beyond the second axial edge to a position spaced outwardly from the second axial edge. The sealing device also includes a pair of arcuate gasket segments extending along the inner surface of the cylinder between the first and second axial gaskets.

The apparatus further comprises a clamping assembly for positioning the first axial edge adjacent to the outer surface of the cylinder so that the second axial edge is positioned adjacent to the inner surface of the cylinder. The axial gaskets are shaped so that when the apparatus is positioned in this manner, they overlap to form a composite thickness in this overlap area approximately equal to the thickness of the arcuate gasket segments. The length of the coupling from one axial edge to the other need not be precisely matched to the circumference of the pipe, because the axial gaskets may slide past one another until the coupling fits the pipe. Thus, when the coupling is fitted over a leak location, the axial joint of the coupling is sealed against leakage without stress on the axial or arcuate gasket segments which might deform the seal that they provide.

The present invention provides the coupling and sealing device as a single unit which is easily installed in a single step without expensive equipment or a high degree of skill. The present invention is lightweight and suitable for use in connection with low to moderate pressure pipes. In addition, the pipe coupling and sealing materials of the present invention are adjustable to the particular diameter of the pipe thereby providing a tight seal around the leak location.

The present invention also provides a gasket apparatus for sealing a leak location in a pipe which comprises a first and second axial gasket, and a pair of arcuate gasket segments extending between the first and second axial gaskets. To seal a leak location, the inner surface of the first axial gasket is positioned so as to overlap the outer surface of the second axial gasket. The axial gaskets are shaped so that the thickness of the area of overlap is approximately equal to the thickness of the arcuate gasket segments. Thus, a coupling may be adjustably fitted over the gasket apparatus without stressing or deforming the seal provided by the axial and arcuate gaskets.

Thus, it is an object of the present invention to provide a pipe coupling that seals all paths of leakage from the interior of the pipe sections to the exterior of the pipe coupling.

It is a further object of the present invention to provide an improved pipe coupling and sealing device combination for sealing a pipe joint or leak location in a pipe.

It is a further object of the present invention to provide a pipe coupling with a sealing device that accommodates variations in pipe diameter.

It is a further object of the present invention to provide a pipe coupling with a sealing device that allows for movement or deflection of the pipe or pipe ends.

It is a further object of the present invention to provide a pipe coupling with gasket material which provides a seal without bunching or buckling between the pipe coupling and the outer surfaces of a pipe.

It is a further object of the present invention to provide a means to seal the axial joint of a pipe coupling without deforming the seal provided by arcuate gasket material positioned between the pipe coupling and the outer surfaces of the pipe.

It is a further object of the present invention to provide a means to seal a leak location in a pipe that can be installed quickly and easily without expensive equipment or a high degree of skill, and without displacing installed pipe ends.

Other objects, features and advantages of the present invention will become apparent upon reading the following detailed description of embodiments of the invention, when taken in conjunction with the accompanying drawing and the appended claims.

BRIEF DESCRIPTION OF THE DRAWING

FIG. 1 is an interior perspective view of a pipe coupling embodying the present invention.

FIG. 2 is a side cross sectional view of the pipe coupling of FIG. 1, taken along line 2—2.

FIG. 3 is an inner perspective view of the first axial gasket of the preferred embodiment of the present invention.

FIG. 4 is an upper perspective view of a portion of the coupling of FIG. 1 showing the extension of the second axial gasket.

FIG. 5 is a side cross sectional view taken along line 5—5 of FIG. 4.

FIG. 6 is a side cross sectional view similar to FIG. 5 showing an alternate connection between the O-ring segments and axial gaskets.

FIG. 7 is an inner perspective view of an alternate embodiment of a pipe coupling of the present invention.

FIG. 8 is a perspective view of the sealing device of the present invention.

DETAILED DESCRIPTION

Referring now to the drawing, in which like numerals indicate like elements throughout the several figures, FIG. 1 is a perspective view of a pipe coupling 10 embodying the preferred form of the present invention. Generally, the preferred embodiment comprises a coupling cylinder 11 and a sealing device 20. The cylinder 11 has an inner surface 12, an outer surface 13, and an axial joint 16 defined by a first axial edge 14 and a second axial edge 15. In the preferred embodiment, the cylinder 11 integrally defines a pair of annular arcuate grooves 25 extending outwardly from the inner surface 12 of the cylinder 11. The cylinder 11 may be formed of stainless steel, another metal or of high-strength plastic.

In the present invention, the sealing device 20 prevents passage of fluid materials to the outer surface 13 of the cylinder 11 when the coupling 10 is installed on a pipeline. The sealing device 20 comprises a first axial gasket 21, a second axial gasket 22 and a pair of arcuate gasket segments 23 extending between the axial gaskets, 21 and 22. The arcuate gaskets 23 are preferably O-ring segments having a hardness of 40 to 70 Durometer, depending upon their intended application. Generally, using the pipe coupling of the present invention with air service pipes at elevated temperatures and pressures requires approximately 70 Durometer rubber O-ring segments. Use of the pipe coupling described herein with low pressure and low temperature water pipes requires approximately 40 Durometer rubber O-ring segments. Further, the O-ring segments of the preferred embodiment may be as large as 1-1/16 inch diameter cord, for large diameter couplings, for example 60-85 inches in diameter. In the preferred embodiment, the first and second axial gaskets, 21 and 22, and the O-ring segments 23 are formed integrally. The first axial gasket 21 is adhered to the inner surface 12 of the cylinder 11 adjacent to the first axial edge 14. The second axial gasket 22 is also adhered to the inner surface 12 of the cylinder 11, but adjacent to the second axial edge 15.

The first and second axial gaskets, 21 and 22, are adhered to the inner surface 12 of the cylinder 11 preferably by a well known chemical vulcanization process. The O-ring segments 23 are adhered to the axial gaskets preferably by a cyanoacrylate adhesive.

In the preferred embodiment, a portion 51 of the second axial gasket 22 extends beyond the second axial edge 15 to a position spaced outwardly from the second axial edge 15 as best shown in FIG. 4. The pair of O-ring segments 23 extend along the inner surface 12 of the cylinder 11 between the first and second gaskets, 21 and 22 respectively. In the preferred embodiment, the O-ring segments 23 are received in the arcuate grooves 25 extending outwardly from the inner surface 12 of the cylinder 11. The grooves 25 may be formed large enough to accommodate larger diameter O-rings when some deflection of pipe ends at a joint is expected. This allows the coupling to maintain a seal during deflection of the pipe ends, because the O-ring is large enough to fill spaces enlarged by the deflection. Optionally, the O-ring segments may be adhered to the cylinder 11 within the grooves 25 by a chemical vulcanization process. A firm bond is not necessary since the coupling holds the segments 23 in place once the coupling is installed.

FIG. 2 illustrates a side cross sectional view of the preferred embodiment of the pipe coupling 10 in a closed or clamped position around a pipe 18. In this position, the first axial edge 14 of the cylinder 11 is positioned to extend over the second axial edge 15 so that an area of overlap 39 of the first and second axial gaskets, 21 and 22, is formed. In other words, the first axial edge 14 is positioned adjacent to the outer surface 13 of the cylinder 11 so that the second axial edge 15 is positioned adjacent to the inner surface 12 of the cylinder 11. The area of overlap 39 of the first and second axial gaskets, 21 and 22, seals the axial joint 16 of the cylinder 11 from leakage. In the preferred embodiment, the axial gaskets 21 and 22 are tapered, so that the thickness of the area of overlap 39 is approximately equal to the thickness of the O-ring segments 23. This uniformity in thickness of the sealing device 20 has several advantages. By this uniformity, the sealing device 20 exerts a generally uniform circumferential pressure upon the pipe. Further, the uniformity in thickness minimizes the possibility of buckling or deforming the axial gaskets 21, 22 or O-ring segments 23, thereby minimizing the possibility of leakage. Thus, when the coupling 10 is fitted over a leak location, the axial joint 16 of the coupling is sealed against leakage without stress on the O-ring segments 23 which might deform the seal that they provide.

The present invention further comprises a clamping assembly 30 for clamping the pipe coupling 10 in place at a leak location. The clamping assembly 30 of the preferred embodiment is of a type well known to those skilled in the art. The clamping assembly 30 comprises a screw 31 attached to the outer surface 13 of the cylinder 11 by a screw hinge 32. The screw 31 is attached at a location spaced apart from the second axial edge 15. The screw 31 extends generally towards the first axial edge 14 of the cylinder 11 and pivots on the screw hinge 32. A screw socket 33 for threadably receiving the screw 31 is also attached to the outer surface 13 of the cylinder 11 by a socket hinge 34, but at a location spaced apart from the first axial edge 14, across the axial joint from the screw 31.

To further clamp the coupling 10 and the sealing device 20 about the leak location, the clamping assembly 30 of the preferred embodiment comprises two worm screws 37 mounted on either side of the screw 31 adjacent to the second axial edge 15 of the outer surface 13 of the cylinder 11. Worm screws are well known to those skilled in the art. In the preferred embodiment, slotted bands 38 are mounted on either side of the socket 33 adjacent to the first axial edge 14 of the outer surface 13 of the cylinder 11 in positions aligned with the positions of the worm screws 37. The slotted bands 38 extend past the first axial edge 14 to be threadably received by the worm screws 37.

The pipe coupling 10 is installed by spreading the axial joint 16 of the coupling 10 so as to fit the coupling 10 around a pipe with the O-ring segments 23 disposed around either side of the leak location or the pipe joint. The coupling 10 is then closed so as to compress the O-rings segments 23 between the cylinder 11 and the pipe, thereby providing a seal around the surfaces of the pipe on either side of the leak location.

In particular, the coupling 10 is closed by drawing the first axial edge 14 over the second axial edge 15. The axial gaskets, 21 and 22, adhered to the inner surfaces of the cylinder 11, slide past one another until the coupling 10 adjustably fits about the pipe. This positions the screw 31 for threading through the screw socket 33. The screw 31 is held in place in the socket 33 by a screw nut 35. Further, the slotted bands 38 are fed through and held in place by the worm screws 37. When the coupling 10 is clamped in place, the area of overlap 39 formed by the axial gaskets, 21 and 22, provides a seal along the axial joint 16 of the pipe coupling 10. In the preferred embodiment, the thickness of this area of overlap 39 is approximately equal to the thickness of the O-rings 23. Advantageously, the sealing device 20 allows for movement or deflection of the pipe ends at a joint without losing their seal about the pipe surface.

FIG. 3 illustrates a perspective view of the first axial gasket 21 adhered to the inner surface 12 of the cylinder 11 in the preferred embodiment. The first axial gasket 21 follows the contours of the arcuate grooves 25 defined by the cylinder 11. The first axial gasket 21 increases in thickness from a line connecting points 41 parallel to and spaced inwardly from the first axial edge 14 to an edge 47 of the first axial gasket 21 opposite to the first axial edge 14, where its thickness is approximately the same as the thickness of the O-ring segments 23. The first axial gasket 21 thickens preferably so as to form a pair of half cones or humps 46 with the tips of the cones 46 on line 41 and the thickest radius of the cones 46 at edge 47 where the first axial gasket 21 meets the O-ring segments 23.

In the preferred embodiment, the first axial gasket 21 defines a pair of recesses 42 for receiving an extending portion 51 of the second axial gasket 22, best shown in FIG. 4 and described in detail below, when the coupling 10 is closed. These recesses 42 follow the contours of the arcuate grooves 25 defined by the cylinder 11. The first axial gasket 21 also preferably defines transverse and longitudinal ridges 43 and 44, respectively, to provide a better seal when the coupling 10 is closed. A pair of longitudinal ridges 44 extend the length of the first axial gasket 21 and are aligned with the O-ring segments 23 and the arcuate grooves 25. Also, transverse ridge 43 extends between and intersects the longitudinal ridges 44 at points 41 spaced inwardly from the first axial edge 14 where the first axial gasket 21 begins to increase in thickness.

Optionally, as shown in FIG. 6, the O-ring segments 23 may be connected to the first axial gasket 21 by insertion into a pair of sockets 45 formed in the edge 47 of first axial gasket 21. In another embodiment of the present invention (not shown), the first axial gasket 21 may extend transversely only between the O-ring segments 23.

FIG. 4 illustrates an upper perspective view of a portion of the coupling 10 of FIG. 1 showing the extending portion 51 of the second axial gasket 22. In the preferred embodiment, the second axial gasket 22 follows the contours of the arcuate grooves 25 defined by the cylinder 11. Optionally, the second axial gasket 22 may extend only between the O-ring segments 23. As best shown in FIG. 5, a portion 51 of the second axial gasket 22 preferably extends beyond the second axial edge 15 of the cylinder 11. Optionally, as shown in FIG. 5, the extending portion 51 may extend outwardly in an area 59 which covers the second axial edge 15.

At the second axial edge 15, the extending portion 51 of the second axial gasket 22 is approximately the thickness of the O-ring segments 23. The extending portion 51 diminishes in thickness as it extends beyond the second axial edge 15 towards its outer edge 55. The progressive thinning of the extending portion 51 of the second axial gasket 22 has several advantages. First, the extending portion 51 in general, and its thin outer edge 55 in particular, help in drawing the axial edges, 14 and 15, to an overlapping position when the coupling 10 is closed. As the first axial edge 14 is drawn over the second axial edge 15, the extending portion 51 reduces friction between the first and second axial gaskets, 21 and 22, and allows the edges, 14 and 15, to slide smoothly into an adjustable closing position. Further, the diminishing thickness of the extending portion 51 of the second axial gasket 22 is received in the recesses 42 defined by the first axial gasket 21 when the coupling 10 is closed. The area of overlap 39 formed by the first and second gaskets, 21 and 22, when the coupling is closed, is of approximately the same thickness as the O-ring segments 23. As noted above, this provides that a uniform circumferential pressure is exerted upon the pipe and that the sealing device 20 maintains a seal without deformity or buckling around the pipe and along the axial joint 16 of the coupling 10.

As illustrated in FIG. 4, in the preferred embodiment the extending portion 51 of the second axial gasket 22 diminishes in thickness so as to form a pair of half cones or humps 53 aligned with the O-ring segments 23. The thickest radius of the cones 53 is at the second axial edge 15 and thins to the tips 56 of the cones 53 at the outer edge 55 of the second axial gasket 22. In closing the coupling 10, the second axial gasket's half cones 53 are received by the recesses 42 of the first axial gasket 21 which, in the preferred embodiment, conform to the contours of the arcuate grooves 25. Optionally, the extending portion 51 of the second axial gasket 22 may extend only in an area aligned with the arcuate gasket segments. As illustrated in FIG. 7, the extending portion 51 may extend only so as to form half cones or humps 53 aligned with the O-ring segments 23.

As best illustrated in FIG. 1, the second axial gasket 22 preferably defines a pair of spaced apart longitudinal ridges 52 which are perpendicular to the second axial edge 15 and which provide a better seal when the coupling 10 is closed. The longitudinal ridges 52 are integrally formed on the second axial gasket 22 and extend the length of the second axial gasket 22 from the arcuate gasket segments 23 to the edge 55, along paths aligned with the O-ring segments 23 and the arcuate grooves 25. As illustrated in FIG. 6 in an alternate embodiment of the present invention, the O-ring segments 23 may be connected to the second axial gasket 22 by being inserted and secured with adhesive in a pair of sockets 54 formed in the second axial gasket 22.

In an alternate embodiment as illustrated in FIG. 7, a sealing device 65 may comprise only O-ring segments 23 and an axial gasket corresponding to the second axial gasket 22. In such an embodiment, O-ring segments 23 extend between the second axial gasket 22 and the first axial edge 14 to which they may be secured by vulcanizing. The segments 23 may taper down in thickness as they approach the edge 14. In the closed position, this alternative embodiment provides an overlap area 39 formed by the O-ring segments 23 overlapping the second axial gasket 22. In the overlap area 39, the axial gasket 22 engages the O-ring segments 23 and thus forms a seal to prevent leakage through the axial joint 15 of the coupling 10.

As illustrated in FIG. 8, the present invention also contemplates that a gasket apparatus 60 for sealing a leak location in a pipe may be provided apart from a pipe coupling. It should be noted that although the gasket apparatus 60 comprises generally the sealing device 20 described above, it may also be used in connection with types of couplings other than the pipe coupling 10 of the preferred embodiment. The gasket apparatus 60 comprises a first axial gasket 21, a second axial gasket 22 and a pair of O-ring segments 23 extending between the first and second gaskets, 21 and 22. It will be appreciated that the gasket apparatus 60 may further comprise the modifications or additional elements described above in connection with the sealing device 20. These modifications or additional elements may include the thickening of the first axial gasket 21 from a point spaced inwardly from the outer edge 61 of the first axial gasket 21 to the edge 47 of the first axial gasket 21 connected to the O-ring segments 23, the thinning of the second axial gasket 22 from a point spaced inwardly from the outer edge 55 of the second axial gasket 22 to the outer edge 55, the definition of recesses 42 and half cones 53, and definition of protruding ridges 43, 44 and 52.

To use the gasket apparatus 60 to seal a leak location, the inner surface 48 of the first axial gasket 21 is positioned so as to overlap the outer surface 58 of the second axial gasket 22. The area of overlap 39 is approximately equal to the thickness of the O-ring segments 23. Thus, a coupling may be readily fitted over the gasket apparatus 60 without stressing or deforming the seal provided by the axial gaskets, 21, 22 and O-ring segments 23.

While this invention has been described in detail with particular reference to preferred embodiments thereof, it will be understood that variations and modifications can be effected within the spirit and scope of the invention as described hereinbefore and as defined in the appended claims.

I claim:

1. An apparatus for sealing a leak location in a pipe, comprising:
   a cylindrical member having an inner surface and an outer surface, and including an axial joint defined by a first axial edge and a second axial edge;
   sealing means for preventing passage of fluid to said outer surface of said cylindrical member, comprising:
   a first axial gasket adhered to said inner surface of said cylindrical member adjacent to said first axial edge;
   a second axial gasket adhered to said cylindrical member adjacent to said second axial edge, a portion of said second axial gasket extending beyond said second axial edge to a position spaced outwardly from said second axial edge; and
   a pair of spaced apart arcuate gaskets extending along said inner surface of said cylindrical member between said first and second axial gaskets; and
   means for positioning said first axial edge adjacent to said outer surface of said cylindrical member such that said second axial edge is positioned adjacent to said inner surface of said cylindrical member, and said arcuate gaskets are on opposite sides of said leak location.

2. The apparatus of claim 1, wherein said first axial gasket, said second axial gasket and said pair of annular gasket segments are formed integrally.

3. The apparatus of claim 1, wherein said first axial gasket increases in thickness toward said arcuate gaskets, beginning at a point at or spaced inwardly from said first axial edge, to approximately the thickness of said arcuate gaskets.

4. The apparatus of claim 1, wherein the thickness of said first axial gasket adhered to said inner surface of said cylindrical member thins progressively from a location spaced apart from said first axial edge to said first axial edge.

5. The apparatus of claim 4, wherein said first axial gasket defines a recess for receiving said extending portion of said second axial gasket when said first axial edge is positioned adjacent to said outer surface of said cylindrical member.

6. The apparatus of claim 1, wherein said first axial gasket defines a recess for receiving said extending portion of said second axial gasket when said first axial edge is positioned adjacent to said outer surface of said cylindrical member.

7. The apparatus of claim 1, wherein said first axial gasket has an inner side, and said first axial gasket defines a transverse ridge on said inner side, said ridge being parallel to and spaced inwardly from said first axial edge, and extending between points aligned with said arcuate gaskets.

8. The apparatus of claim 7, wherein said first axial gasket further defines a pair of longitudinal ridges on said inner side, said pair of ridges being aligned with said arcuate gaskets, and intersecting said transverse ridge.

9. The apparatus of claim 1, wherein said first axial gasket defines a pair of sockets on the side of said first axial gasket opposite to said first axial edge for receiving said pair of arcuate gaskets.

10. The apparatus of claim 1, wherein the thickness of said extending portion of said second axial gasket thins progressively as said portion extends beyond said second axial edge.

11. The apparatus of claim 10, wherein said extending portion of said second axial gasket defines a pair of humps located along paths aligned with said arcuate gaskets.

12. The apparatus of claim 11, wherein said first axial gasket defines recesses for receiving said humps of said extending portion of said second axial gasket.

13. The apparatus of claim 1, wherein said extending portion of said second axial gasket extends only in an area aligned with said pair of arcuate gaskets.

14. The apparatus of claim 1, wherein said second axial gasket has an inner side, and said second axial gasket defines a pair of longitudinal ridges on said inner side aligned with said arcuate gaskets.

15. The apparatus of claim 1, wherein said second axial gasket defines a pair of sockets on the side of said second axial gasket opposite to said second axial edge for receiving said pair of annular gasket segments.

16. The apparatus of claim 1, wherein said first and second axial gaskets overlap when said first axial edge is positioned adjacent to said outer surface of said cylindrical member, and said overlapping portion is approximately equal in thickness to the thickness of said arcuate gaskets.

17. The apparatus of claim 16, wherein said overlapping portion is formed such that said sealing means exerts a generally uniform circumferential pressure upon said pipe.

18. The apparatus of claim 1, wherein said cylindrical member defines a pair of annular arcuate grooves extending outwardly from said inner surface for receiving said pair of arcuate gaskets.

19. The apparatus of claim 18, wherein said first and second axial gaskets are shaped to follow the contours of said arcuate grooves.

20. The apparatus of claim 19, wherein said extending portion of said second axial gasket extends only in an area aligned with said pair of annular arcuate grooves.

21. A gasket apparatus for use in sealing a leak location in a pipe, comprising:
   a first axial gasket having an inner surface and an outer surface;
   a second axial gasket having an inner surface and an outer surface;
   said first and second axial gaskets being shaped so that when said inner surface of said first axial gasket is positioned adjacent to said outer surface of said second axial gasket said first and second axial gaskets overlap to form a combined thickness;
   a pair of spaced apart arcuate gaskets extending between said first and second axial gaskets; and
   said combined thickness being approximately equal to the thickness of said arcuate gaskets.

22. The apparatus of claim 21, wherein said first axial gasket, said second axial gasket and said pair of arcuate gaskets are formed integrally.

23. The apparatus of claim 21 wherein said first and second axial gaskets each further define a pair of sockets for receiving said pair of arcuate gaskets.

24. The apparatus of claim 21, wherein said first axial gasket has a first axial edge opposite to said arcuate gaskets, and said first axial gasket increases in thickness, beginning at a point at or spaced inwardly from said first axial edge, to approximately the thickness of said arcuate gaskets adjacent to said arcuate gaskets.

25. The apparatus of claim 24, wherein said inner surface of said first axial gasket defines a recess, and said second axial gasket defines an extending portion, whereby said recess receives said extending portion when said inner surface of said first axial gasket is positioned adjacent to said upper surface of said second axial gasket.

26. The apparatus of claim 25, wherein said first axial gasket further defines a transverse ridge on said inner surface, said ridge being parallel to and spaced inwardly from said first axial edge, and extending between points aligned with said arcuate gaskets.

27. The apparatus of claim 26, wherein said first axial gasket further defines a pair of longitudinal ridges on said inner surface, said pair of ridges aligned said arcuate gaskets.

28. The apparatus of claim 21, wherein said second axial gasket has a second axial edge opposite to said arcuate gaskets, and the thickness of said second axial gasket thins progressively towards said second axial edge.

29. The apparatus of claim 28, wherein said second axial gasket defines a pair of longitudinal ridges on said inner surface aligned with said arcuate gaskets.

30. The apparatus of claim 28, wherein said second axial gasket defines a pair of humps located along paths aligned with said arcuate gaskets.

31. The apparatus of claim 30, wherein said first axial gasket defines recesses for receiving said humps of said second axial gasket.

32. An apparatus for sealing a leak location in a pipe, comprising:
   a cylindrical member having an inner surface and an outer surface, and including an axial joint defined by a first axial edge and a second axial edge;
   sealing means for preventing passage of fluid to said outer surface of said cylindrical member, comprising:
   an axial gasket adhered to said cylindrical member adjacent to said second axial edge, a portion of said axial gasket extending beyond said second axial edge to a position spaced outwardly from said second axial edge; and
   a pair of spaced apart arcuate gaskets extending along said inner surface of said cylindrical member between said axial gasket and said first axial edge;
   means for positioning said first axial edge adjacent to said outer surface of said cylindrical member such that said second axial edge is positioned adjacent to said inner surface of said cylindrical member, and said arcuate gaskets are on opposite sides of said leak location; and
   said axial gasket and said arcuate gaskets being shaped so that when said second axial edge is positioned adjacent to said inner surface of said cylindrical member said axial gasket and said arcuate gaskets overlap to form a combined thickness equal to the thickness of said arcuate gaskets.

33. The apparatus of claim 32, wherein said axial gasket and said pair of arcuate gaskets are formed integrally.

34. The apparatus of claim 32, wherein the thickness of said extending portion of said second axial gasket thins progressively as said portion extends beyond said second axial edge.

35. The apparatus of claim 34, wherein said extending portion of said second axial gasket defines a pair of humps located along paths aligned with said arcuate gaskets.

36. The apparatus of claim 32, wherein said extending portion of said second axial gasket extends only in an area aligned with said pair of arcuate gaskets.

37. The apparatus of claim 32, wherein said second axial gasket has an inner side, and said second axial gasket defines a pair of longitudinal ridges on said inner side aligned with said arcuate gaskets.

38. The apparatus of claim 32, wherein said second axial gasket defines a pair of sockets on the side of said second axial gasket opposite to said second axial edge for receiving said pair of annular gasket segments.

39. A method of sealing a leak location in a pipe, comprising the steps of:
   (a) positioning a sealing means including a first axial gasket, a second axial gasket and arcuate gaskets extending between said first and second axial gaskets around a leak location such that said arcuate gaskets are against the surface of the pipe on each side of the leak location;
   (b) positioning a cylindrical coupling having an inner surface and an outer surface, and including an axial joint defined by a first axial edge and a second axial edge around said sealing means; and
   (c) positioning said first axial edge of said coupling adjacent to said outer surface of said coupling such that said second axial edge is positioned adjacent to said inner surface of said cylindrical coupling so as to seal said cylindrical coupling to prevent passage of fluid to said outer surface of said cylindrical coupling.

* * * * *